(12) United States Patent
Yamaguchi

(10) Patent No.: US 6,724,921 B2
(45) Date of Patent: *Apr. 20, 2004

(54) METHOD OF PROCESSING IMAGE INFORMATION AND METHOD OF PREVENTING FORGERY OF CERTIFICATES OR THE LIKE

(75) Inventor: Takashi Yamaguchi, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/166,165

(22) Filed: Jun. 11, 2002

(65) Prior Publication Data

US 2002/0181025 A1 Dec. 5, 2002

Related U.S. Application Data

(62) Division of application No. 09/203,562, filed on Dec. 2, 1998, now Pat. No. 6,438,251.

(30) Foreign Application Priority Data

Dec. 3, 1997 (JP) .............................. 9-332943
Jun. 11, 1998 (JP) ........................... 10-163558

(51) Int. Cl.[7] ................................................ G06K 9/00
(52) U.S. Cl. .................................... 382/118; 358/3.28
(58) Field of Search ................................ 382/100, 112, 382/115, 118, 162, 216, 282, 283, 306, 232; 235/384; 380/252; 713/176, 179, 186

(56) References Cited

U.S. PATENT DOCUMENTS 3,067,659 A * 12/1962 Schwimmer ................ 430/396

(List continued on next page.)

FOREIGN PATENT DOCUMENTS

| EP | 0 411 232 A2 | 10/1989 |
|---|---|---|
| EP | 0 554 115 A1 | 8/1993 |
| GB | 2196167 A | 4/1998 |
| JP | 9-248935 | 9/1997 |
| WO | WO 95/14289 | 5/1995 |

OTHER PUBLICATIONS

Chow et al., "Forgery and Tamper–Proof Identification Document", Department of Communication, Ottawa, Canada, IEEE–1993, pp. 11–14.*

Yasuhiro Nakamura, "A Unified Coding Method Of Dithered Image And Text Data Using Color Micro–Patterns", The Journal Of The Institute Of Image Electronics Engineers Of Japan, Apr. 17, 1988, pp. 194–1948.

Safranek et al., "A Perceptually Tuned Sub–band Image Coder with Image Dependent. .Compression", iEEE 1989, pp. 1945–1948.

Bamberger et al., "Predictive Coding Schemes for Sub–band Image Codes", IEEE 1989, pp. 872–877.

*Primary Examiner*—Jayanti K. Patel
(74) *Attorney, Agent, or Firm*—Pillsbury Winthrop LLP

(57) ABSTRACT

Additional information, composed of characters, images, voice, etc., is converted into two-dimensional codes and then converted into a visible additional image to be embedded. The additional image is embedded in a full-color main image in a state of invisibility to produce a composite image. The composite image is recorded on a non-electronic medium such as paper or on an electronic medium, such as a memory on a personal computer, over the Internet. The embedded additional image is extracted from the composite image recorded on the recording medium and the additional information is reproduced.

1 Claim, 17 Drawing Sheets

U.S. PATENT DOCUMENTS

| | | | |
|---|---|---|---|
| 4,982,277 A | | 1/1991 | Katoh et al. .................... 358/80 |
| 5,169,155 A | * | 12/1992 | Soules et al. ................ 273/293 |
| 5,369,261 A | | 11/1994 | Shamir ........................ 235/469 |
| 5,374,976 A | | 12/1994 | Spannenburg .............. 355/201 |
| 5,449,200 A | | 9/1995 | Andric et al. .................. 283/67 |
| 5,502,576 A | | 3/1996 | Ramsay et al. .............. 358/444 |
| 5,522,623 A | * | 6/1996 | Soules et al. ................. 283/91 |
| 5,530,759 A | | 6/1996 | Braudaway et al. ........... 380/54 |
| 5,568,555 A | | 10/1996 | Shamir ......................... 380/51 |
| 5,617,119 A | | 4/1997 | Briggs et al. ................ 345/611 |
| 5,636,292 A | | 6/1997 | Rhoads ....................... 382/232 |
| 5,687,236 A | | 11/1997 | Moskowitz et al. ........... 380/28 |
| 5,727,092 A | | 3/1998 | Sandford, II et al. ........ 382/251 |
| 5,825,892 A | | 10/1998 | Braudaway et al. ........... 380/51 |
| 5,893,101 A | | 4/1999 | Balogh et al. ............... 707/100 |
| 5,930,369 A | | 7/1999 | Cox et al. ...................... 380/54 |
| 5,946,414 A | | 8/1999 | Cass et al. ................... 382/183 |
| 5,974,150 A | * | 10/1999 | Kaish et al. ................. 713/179 |
| 5,974,548 A | | 10/1999 | Adams ........................ 713/200 |
| 6,006,328 A | * | 12/1999 | Drake ......................... 713/200 |
| 6,053,405 A | * | 4/2000 | Irwin et al. .................. 235/375 |

* cited by examiner

MASK IMAGE (MSK)

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 1 | 1 | 0 | 0 | 1 | 1 | 0 | 0 | 1 | 1 | 0 | 0 | 1 | 1 | 0 | 0 |
| 1 | 0 | 1 | 1 | 1 | 0 | 0 | 1 | 1 | 0 | 0 | 1 | 1 | 0 | 0 | 1 | 1 |
| 2 | 1 | 0 | 0 | 0 | 1 | 1 | 0 | 0 | 1 | 1 | 0 | 0 | 1 | 1 | 0 | 0 |
| 3 | 0 | 1 | 1 | 1 | 0 | 0 | 1 | 1 | 0 | 0 | 1 | 1 | 0 | 0 | 1 | 1 |
| 4 | 1 | 0 | 0 | 1 | 1 | 1 | 0 | 0 | 1 | 1 | 0 | 0 | 1 | 1 | 0 | 0 |
| 5 | 0 | 1 | 1 | 0 | 0 | 0 | 1 | 1 | 0 | 0 | 1 | 1 | 0 | 0 | 1 | 1 |
| 6 | 1 | 0 | 0 | 1 | 1 | 1 | 0 | 0 | 1 | 1 | 0 | 0 | 1 | 1 | 0 | 0 |
| 7 | 0 | 1 | 1 | 0 | 0 | 0 | 1 | 1 | 0 | 0 | 1 | 1 | 0 | 0 | 1 | 1 |
| 8 | 1 | 0 | 0 | 1 | 1 | 1 | 0 | 0 | 1 | 1 | 0 | 0 | 1 | 1 | 0 | 0 |
| 9 | 0 | 1 | 1 | 0 | 0 | 0 | 1 | 1 | 0 | 0 | 1 | 1 | 0 | 0 | 1 | 1 |
| 10 | 1 | 1 | 0 | 0 | 1 | 1 | 0 | 0 | 1 | 1 | 0 | 0 | 1 | 1 | 0 | 0 |
| 11 | 0 | 0 | 1 | 1 | 0 | 0 | 1 | 1 | 0 | 0 | 1 | 1 | 0 | 0 | 1 | 1 |

FIG. 7

ADDITIONAL IMAGE (STL)

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 2 | 0 | 0 | 1 | 1 | 1 | 1 | 0 | 0 | 0 | 0 | 0 | 0 | 0 | 0 | 0 | 0 |
| 3 | 0 | 0 | 1 | 1 | 1 | 1 | 0 | 0 | 0 | 0 | 0 | 0 | 0 | 0 | 0 | 0 |
| 4 | 0 | 0 | 1 | 1 | 1 | 1 | 0 | 0 | 0 | 0 | 0 | 0 | 0 | 0 | 0 | 0 |
| 5 | 0 | 0 | 1 | 1 | 1 | 1 | 0 | 0 | 0 | 0 | 0 | 0 | 0 | 0 | 0 | 0 |
| 6 | 0 | 0 | 0 | 0 | 0 | 0 | 1 | 1 | 1 | 1 | 1 | 1 | 1 | 1 | 0 | 0 |
| 7 | 0 | 0 | 0 | 0 | 0 | 0 | 1 | 1 | 1 | 1 | 1 | 1 | 1 | 1 | 0 | 0 |
| 8 | 0 | 0 | 0 | 0 | 0 | 0 | 1 | 1 | 1 | 1 | 1 | 1 | 1 | 1 | 0 | 0 |
| 9 | 0 | 0 | 0 | 0 | 0 | 0 | 1 | 1 | 1 | 1 | 1 | 1 | 1 | 1 | 0 | 0 |
| 10 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 |

FIG. 8

RESULTS OF SMOOTHING PROCESS (W)

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | x | 0 | 0 | 0 | 0 | 0 | 0 | 0 | 0 | 0 | 0 | 0 | 0 | 0 | 0 | x |
| 1 | x | 0 | 0 | 0 | 0 | 0 | 0 | 0 | 0 | 0 | 0 | 0 | 0 | 0 | 0 | x |
| 2 | x | 0.25 | 0.75 | 1 | 1 | 0.75 | 0.25 | 0 | 0 | 0.25 | 0.75 | 1 | 1 | 0.75 | 0.25 | x |
| 3 | x | 0.25 | 0.75 | 1 | 1 | 0.75 | 0.25 | 0 | 0 | 0.25 | 0.75 | 1 | 1 | 0.75 | 0.25 | x |
| 4 | x | 0.25 | 0.75 | 1 | 1 | 0.75 | 0.25 | 0 | 0 | 0.25 | 0.75 | 1 | 1 | 0.75 | 0.25 | x |
| 5 | x | 0.25 | 0.75 | 1 | 1 | 0.75 | 0.25 | 0 | 0 | 0.25 | 0.75 | 1 | 1 | 0.75 | 0.25 | x |
| 6 | x | 0 | 0 | 0 | 0 | 0.25 | 0.75 | 1 | 1 | 1 | 1 | 1 | 1 | 0.75 | 0.25 | x |
| 7 | x | 0 | 0 | 0 | 0 | 0.25 | 0.75 | 1 | 1 | 1 | 1 | 1 | 1 | 0.75 | 0.25 | x |
| 8 | x | 0 | 0 | 0 | 0 | 0.25 | 0.75 | 1 | 1 | 1 | 1 | 1 | 1 | 0.75 | 0.25 | x |
| 9 | x | 0 | 0 | 0 | 0 | 0.25 | 0.75 | 1 | 1 | 1 | 1 | 1 | 1 | 0.75 | 0.25 | x |
| 10 | x | 0 | 0 | 0 | 0 | 0 | 0 | 0 | 0 | 0 | 0 | 0 | 0 | 0 | 0 | x |
| 11 | x | 0 | 0 | 0 | 0 | 0 | 0 | 0 | 0 | 0 | 0 | 0 | 0 | 0 | 0 | x |

RESULTS OF COLOR DIFFERENCE MODULATION   RED COMPONENT (VR)

FIG.11

RESULTS OF SUPERIMPOSITION PROCESS RED COMPONENT (DESR)

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 79 | 79 | 175 | 175 | 79 | 79 | 175 | 175 | 79 | 79 | 175 | 175 | 79 | 79 | 175 | 175 |
| 1 | 175 | 175 | 79 | 79 | 175 | 175 | 79 | 79 | 175 | 175 | 79 | 79 | 175 | 175 | 79 | 79 |
| 2 | 79 | 79 | 175 | 175 | 79 | 79 | 175 | 175 | 79 | 79 | 175 | 175 | 79 | 79 | 175 | 175 |
| 3 | 175 | 175 | 79 | 79 | 175 | 175 | 79 | 79 | 175 | 175 | 79 | 79 | 175 | 175 | 79 | 79 |
| 4 | 79 | 79 | 175 | 175 | 79 | 79 | 175 | 175 | 79 | 79 | 175 | 175 | 79 | 79 | 175 | 175 |
| 5 | 175 | 175 | 79 | 79 | 175 | 175 | 79 | 79 | 175 | 175 | 79 | 79 | 175 | 175 | 79 | 79 |
| 6 | 79 | 79 | 175 | 175 | 79 | 79 | 175 | 175 | 79 | 79 | 175 | 175 | 79 | 79 | 175 | 175 |
| 7 | 175 | 175 | 79 | 79 | 175 | 175 | 79 | 79 | 175 | 175 | 79 | 79 | 175 | 175 | 79 | 79 |
| 8 | 79 | 79 | 175 | 175 | 79 | 79 | 175 | 175 | 79 | 79 | 175 | 175 | 79 | 79 | 175 | 175 |
| 9 | 175 | 175 | 79 | 79 | 175 | 175 | 79 | 79 | 175 | 175 | 79 | 79 | 175 | 175 | 79 | 79 |
| 10 | 79 | 79 | 175 | 175 | 79 | 79 | 175 | 175 | 79 | 79 | 175 | 175 | 79 | 79 | 175 | 175 |
| 11 | 175 | 175 | 79 | 79 | 175 | 175 | 79 | 79 | 175 | 175 | 79 | 79 | 175 | 175 | 79 | 79 |

FIG. 12

RESULTS OF RECOVERY (a) RED COMPONENT

FIG. 13

RESULTS OF RECOVERY (b) RED COMPONENT

FIG. 14

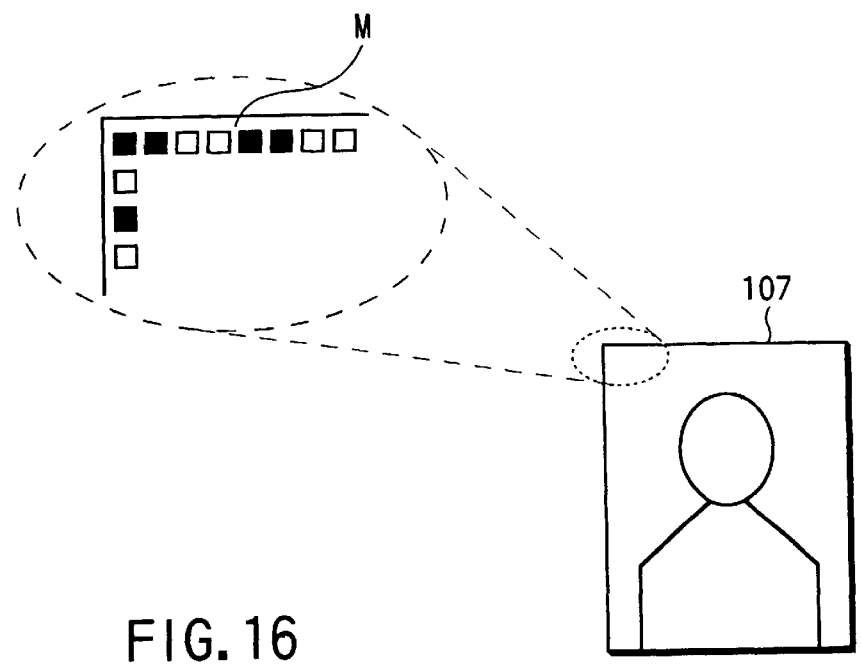
FIG. 16
FIG. 17
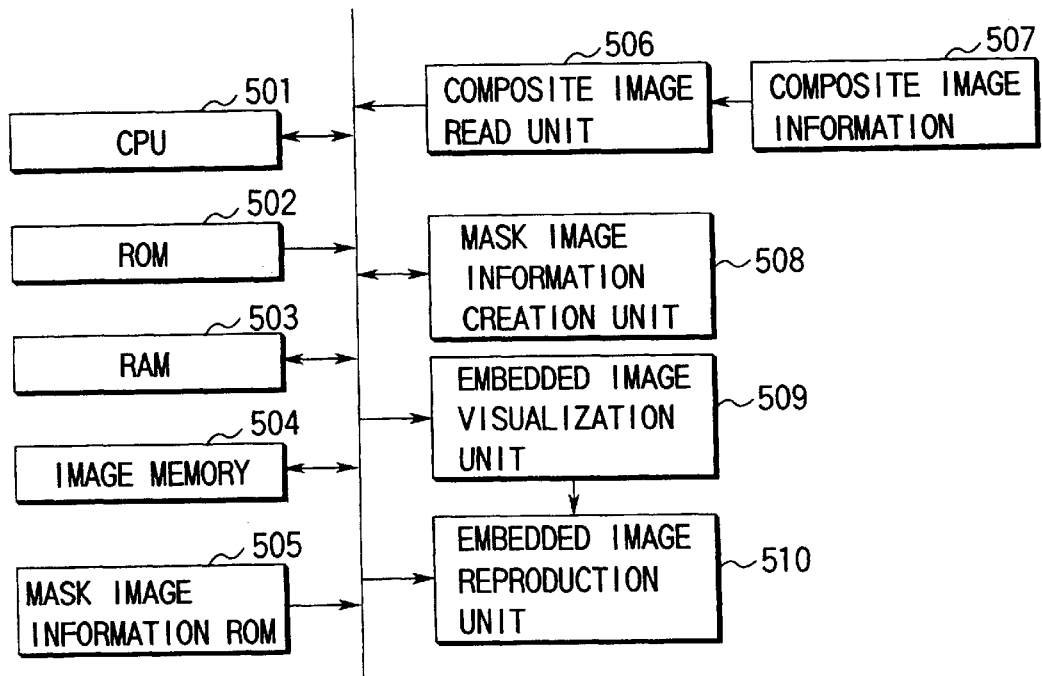
FIG. 19

METHOD OF PROCESSING IMAGE INFORMATION AND METHOD OF PREVENTING FORGERY OF CERTIFICATES OR THE LIKE

This is a Divisional of application Ser. No. 09/203,562 filed Dec. 2, 1998, now U.S. Pat. No. 6,438,251, which designated the U.S.

BACKGROUND OF THE INVENTION

The present invention relates to an image information processing method and device for, on main image information, such as a face photograph of a person, recording additional image information, such as security information, in a state of invisibility. Further, the present invention relates to a method of preventing forgery of certificates or the like using the image information processing method.

In recent years, with the promotion of digitization of information and the spread of the Internet, importance has been set on techniques such as digital watermarking, digital signature, and so on. The study of a special encryption scheme, called "image deep layer encryption", as one of these techniques has been promoted. This scheme, which records additional information in such a way that it is embedded in main image information in a state of invisibility, provides an effective measure against unauthorized copying, forgery, and tampering of identity cards printed with face photographs and photographs which have copyright information embedded in.

For example, a method of superimposing information on a pseudogradation-represented digital image is disclosed in an article entitled "Encoding Method of Combining Text Data with an Image of Color Density Pattern", the Journal of the Institute of Image Electronics, 17-4, 1988, pp. 194–198.

Moreover, Japanese Unexamined Patent Publication No. 4-294862 discloses a method which, on the basis of a hard copy output of a color copying machine, identifies that copying machine.

Furthermore, Japanese Unexamined Patent Publication No. 8-57529 discloses a method of embedding a monochrome bi-level image in a color image using color differences.

However, in the method of combining text data with a color density pattern image with encoding and the method disclosed in the Patent Publication No. 4-294862, image information is only embedded in either an electronic medium or a non-electronic medium (paper). Any technique that can be applied to both the media is not disclosed nor suggested.

The conventional image information processing techniques described above are all intended to deal only with color image information as main image information. That is, no monochrome image information is included in the subject of processing.

Although methods of embedding image information are disclosed, nothing is disclosed for an overall system configuration for embedding, recording, and reproducing image information.

BRIEF SUMMARY OF THE INVENTION

It is an object of the present invention to provide an image information processing method and device which permits composite image information in which additional information is superimposed on main image information to be produced and permits the additional information to be reproduced from the composite image regardless of which of an electronic recording medium and a non-electronic recording medium it has been recorded on.

It is another object of the present invention to provide an image information processing method and a method of preventing the forgery of certificates and so on using the image information processing method which provide great security against forgery without making any difference between color image and black and white image information as recorded images.

In order to achieve the object, according to one aspect of the present invention, there is provided an image processing method comprising the steps of: converting predetermined additional information into a visible additional image to be embedded in a main image; creating a composite image by embedding the additional image in the main image in a state of invisibility; recording the composite image on a recording medium; and extracting the embedded additional image from the composite image recorded on the recording medium to recover the predetermined information.

The conversion step includes a substep of converting the additional information into visible two-valued two-dimensional codes and a substep of modulating the two-dimensional codes using mask pattern information, and the reproduction step includes a substep of extracting the additional image from the composite image using the mask pattern information.

The method of the present invention further comprises a step of converting a full-color main image into an achromatic image composed of R, G, and B components, and the creation step creates the composite image in such a way that it looks black and white to the human visual system and its respective pixel is composed of multiple color components.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 7 illustrates an example of a specific computation in the composite image creation procedure;

FIG. 8 illustrates an example of a specific computation in the composite image creation procedure;

FIG. 9 illustrates an example of a specific computation in the composite image creation procedure;

FIG. 10 illustrates an example of a specific computation in the composite image creation procedure;

FIG. 11 illustrates an example of a specific computation in the composite image creation procedure;

FIG. 12 illustrates an example of a specific computation in the composite image creation procedure;

FIG. 13 illustrates an example of a specific computation in the composite image creation procedure;

FIG. 14 illustrates an example of a specific computation in the composite image creation procedure;

FIG. 16 is a diagram for use in explanation of alignment marks in a composite image;

FIG. 17 shows an example of a bi-level mask image;

FIG. 19 is a block diagram of an image reproducing system;

DETAILED DESCRIPTION OF THE INVENTION

Figure 1:
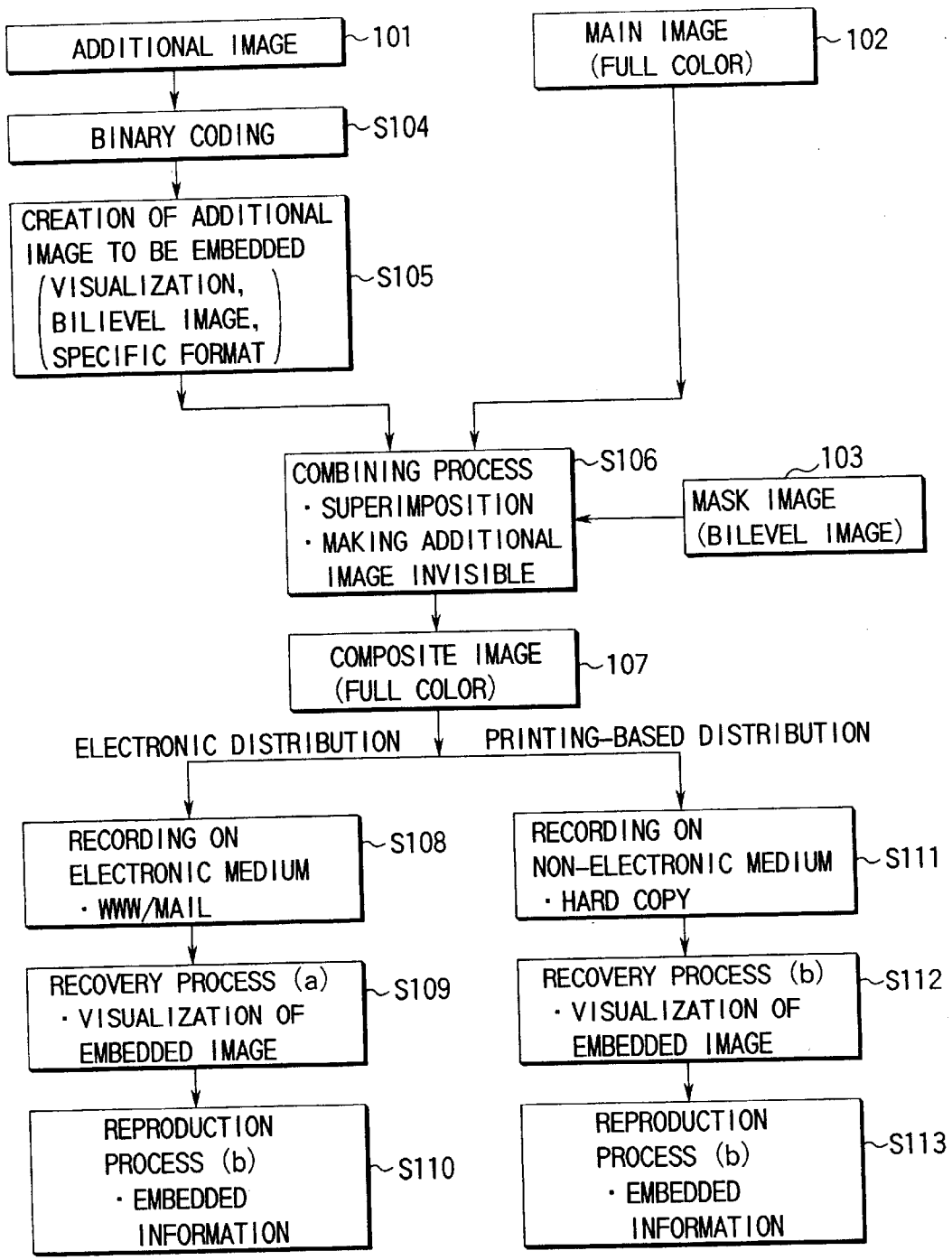
FIG. 1 is a flowchart illustrating image information processing according to an embodiment of the present invention.

Referring now to FIG. 1, there is shown a flowchart illustrating an image information processing method according to the present invention. Hereinafter, the image information processing method of the present invention will be described with reference to this flowchart.

Additional information 101 to be embedded includes characters, images, sound, etc., which are information a creator wants to embed invisibly. A main image 102 is an image in which additional information is to be embedded, such as a photograph of a person's face on an identity card. The main image serves as information for producing a full-color image. A mask image (pattern image information) 103 is two-valued image information which is used in a combining process (step S106) and a recovery process (a) or (b) (step S109 or S112) as will be described later.

In the first place, in binary coding step S104, the to-be-embedded information 101 is binary-coded (two-valued and coded). In this case, analog data, such as sound, is first subjected to analog-to-digital conversion and then binary-coded. On the other hand, digital data, such as characters and images, is binary-coded as it is.

Next, in to-be-embedded image creating step S105, the binary (two-valued) data produced in binary coding step S104 is converted into binary image data in accordance with a predetermined format, thereby producing a to-be-embedded additional image. By this process, even data that is usually invisible, such as sound data, is converted into visible data (binary image data).

Next, in combining step S106, the to-be-embedded image produced in step S105, the main image 102, and the mask image 103 are combined into a full-color composite image 107. The composite image 107, when made visible, apparently looks identical to the main image 102; the additional image is hidden in a state of invisibility. The composite image 107 can be stored in a commonly used format, for example, TIFF or JPEG.

The composite image 107 thus produced can be distributed via either an electronic medium, such as a home page on the Internet or electronic mail, or a non-electronic medium such as paper.

First, the distribution of the composite image via an electronic medium will be described. In recording step S108, the composite image 107 produced in combining step S106 is recorded on an electronic medium, such as a home page or electronic mail on the Internet.

Next, a person who received the composite image recorded on the electronic medium performs a recovery operation in step (a) S109 to make visible the additional image invisibly embedded in the composite image. After that, the recipient performs a reproduction operation in step (a) S110 to reproduce the embedded additional information 101.

The distribution of the composite image through a non-electronic medium will be described. In recording step S111, the composite image 107 produced in combining step S106 is recorded on a non-electronic medium such as paper.

Next, a person who received the composite image 107 recorded on the non-electronic medium performs a recovery operation in step (b) S112 to make visible the additional image invisibly embedded in the composite image. After that, the recipient performs a reproduction operation in step (b) S113 to reproduce the embedded additional information.

Figure 2:
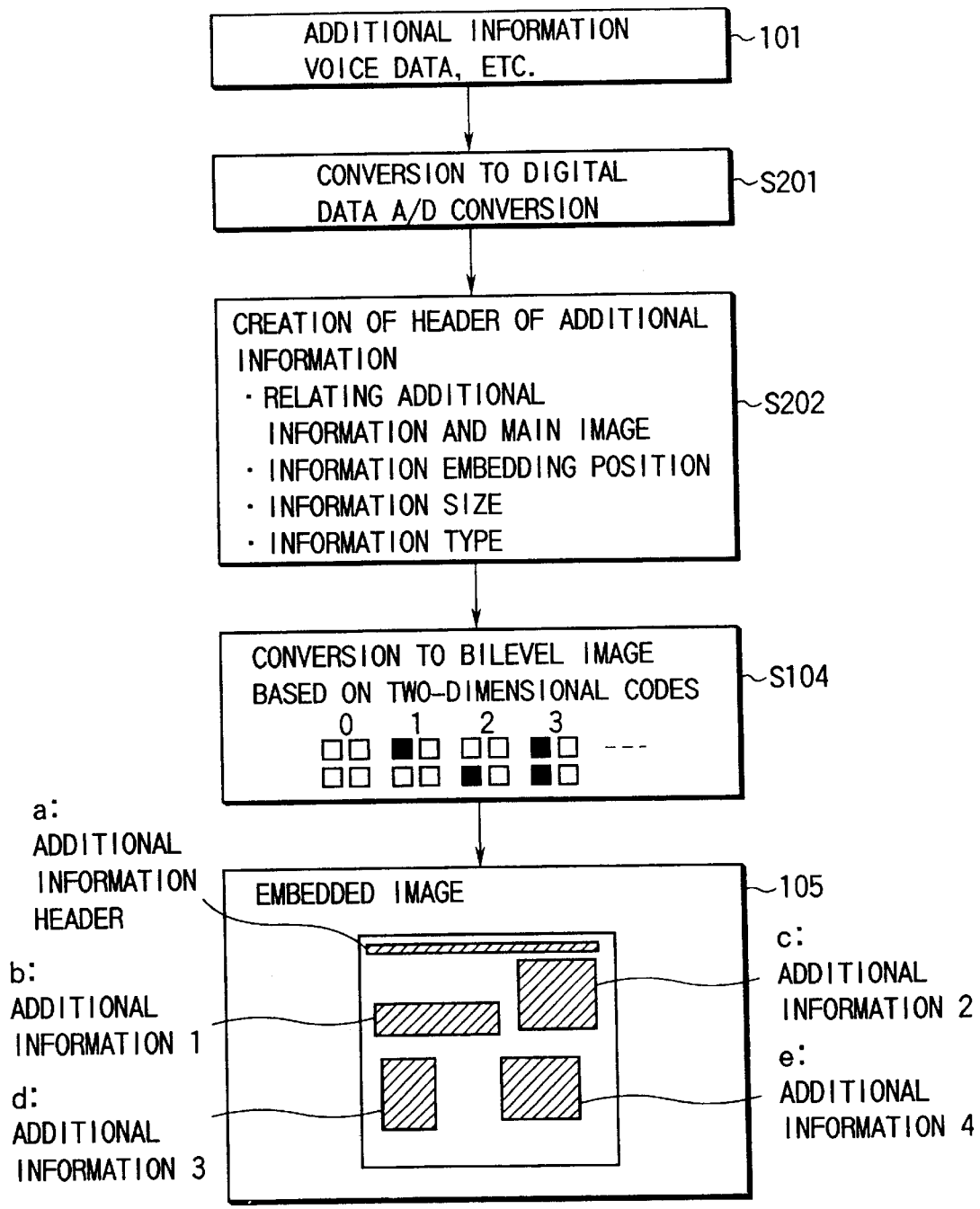
FIG. 2 illustrates the procedure for creating an additional image to be embedded.

Reference will be made next to FIG. 2 to describe the method for creating the additional image to be embedded in more detail.

First, in A/D conversion step S201, the additional embedded information 101 consisting of analog data, such as sound, is converted into digital data. For data that has been digitized in advance, the process of analog-to-digital conversion is omitted.

Next, in header creation step S202, a header for the additional information is produced. In order to relate the additional information with the main image, the header contains the embedding position, the size, the type, and the attribute information for each piece of additional information. The header information is used when reproducing the embedded additional information. Table 1 below shows an example of a header for additional information to be embedded.

TABLE 1

| Item | Symbol | Data size |
|---|---|---|
| Header size | HdrSize | 4 byte |
| Additional | StlInfoNum | 2 byte |

TABLE 1-continued

| Item | Symbol | Data size |
| --- | --- | --- |
| Information numbers | | |
| Information 1 position (x, y) | 1EmbPosX, 1EmbPosY | 4 byte, 4 byte |
| Information 1 size (x, y) | 1EmbSizeX, 1EmbSizeY | 4 byte, 4 byte |
| Information 1 type | 1EmbType | 2 byte |
| . . . | . . . | . . . |
| Information n position (x, y) | nEmbPosX, nEmbPosY | 4 byte, 4 byte |
| Information n size (x, y) | NEmbSizeX, nEmbSizeY | 4 byte, 4 byte |
| Information n type | nEmbType | 2 byte |

Figure 3:
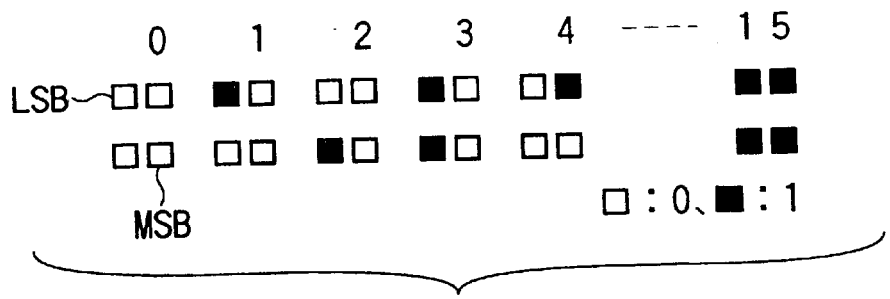
FIG. 3 is a diagram for use in explanation of conversion of a to-be-embedded additional image into a bi-level image based on two-dimensional codes.

The type of additional information describes what the information is. For example, in the case of hexadecimal representation, it is represented as "xy" as follows:

xy(H)

where x (high-order four bits). . . represents the type of data
=1 . . . text
=2 . . . image
=3 . . . sound
y (low-order four bits). . . represents the attribute of data
=1 . . . reproduction on recovery
=2 . . . reproduction after confirmation on recovery
=3 . . . recovery only Next, in binary coding step S104, the digitized to-be-embedded information and header are converted into a bilevel image using two-dimensional codes indicated below. To this end, the to-be-embedded information which is binary is divided from the beginning into blocks of four bits. Each block which is four bits is replaced with a black and white image region of 2×2 pixels as shown in FIG. 3, depending on its value. In each block of FIG. 3, the upper left pixel corresponds to the least significant bit (LSB), the lower left pixel to the next high-order bit, the upper right pixel to the next high-order bit, and the lower right pixel to the most significant bit (MSB).

For example, suppose that to-be-embedded additional information is arranged from the beginning in hexadecimal representation as follows:

FF 01 45 D3 . . .

Figure 4:
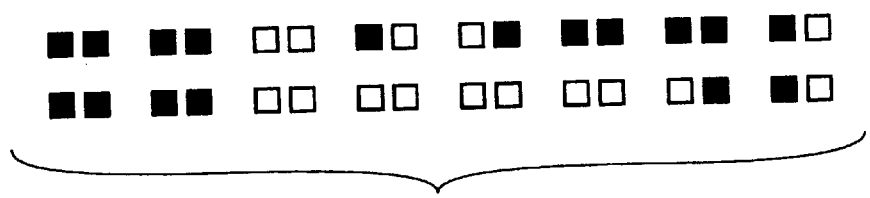
FIG. 4 is a diagram for use in explanation of conversion of a to-be-embedded additional image into a bi-level image based on two-dimensional codes.

Then, these are replaced with image elements as shown in FIG. 4.

Figure 5:
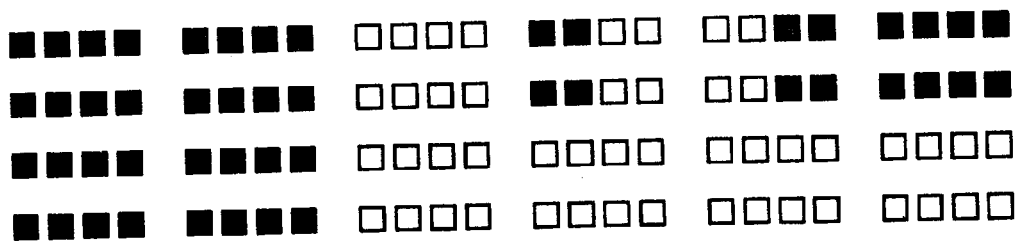
FIG. 5 is a diagram for use in explanation of conversion of a to-be-embedded additional image into a bi-level image based on two-dimensional codes.

Further, the bilevel image information is enlarged by a factor of n in order to prevent the degradation of to-be-embedded images during a smoothing step in the combining process to be described later. Here, it is preferable that n=2, 3 or 4. In FIG. 5 there is shown the result of enlarging the bilevel image information of FIG. 4 by a factor of two.

Although, in this embodiment, the calra code is applied to the two-dimensional coding, a matrix type two-dimensional code or a two-dimensional bar code, such as the glyph code, can be used.

After the replacement of all the to-be-embedded additional information with two-dimensional codes, in step S105, these are laid out two-dimensionally to obtain the to-be-embedded images. In this example, as the to-be-embedded image, the header a, the first information b, the second information c, the third information d, and the fourth information e are converted into two-dimensional codes.

At the time of creation of the to-be-embedded information header and the to-be-embedded information, each piece of to-be-embedded information is related with the main image. This provides a criterion for allowing users to draw certain specific information from multiple pieces of information embedded in a composite image.

For example, in a case where the present invention is applied to an electronic picture book, suppose that photographs of a zoo are used as main images. Among these photographs, for example, a photograph of lions will be associated with their cries and a photograph of penguins will be associated with their ecology. Thus, if a main image and embedded information are related so that the main image can be relatively easily associated with the embedded information, then it will become easy for users to find desired one from multiple pieces of embedded information.

Furthermore, for example, when the present invention is applied to an identity card, a photograph of the owner's face is used as a main image and personal information that identifies the owner is used as to-be-embedded information. The personal information may be made of fingerprints or voiceprint. Voiceprint information can be embedded in a portion of the face photograph that corresponds with the mouth.

Figure 6:
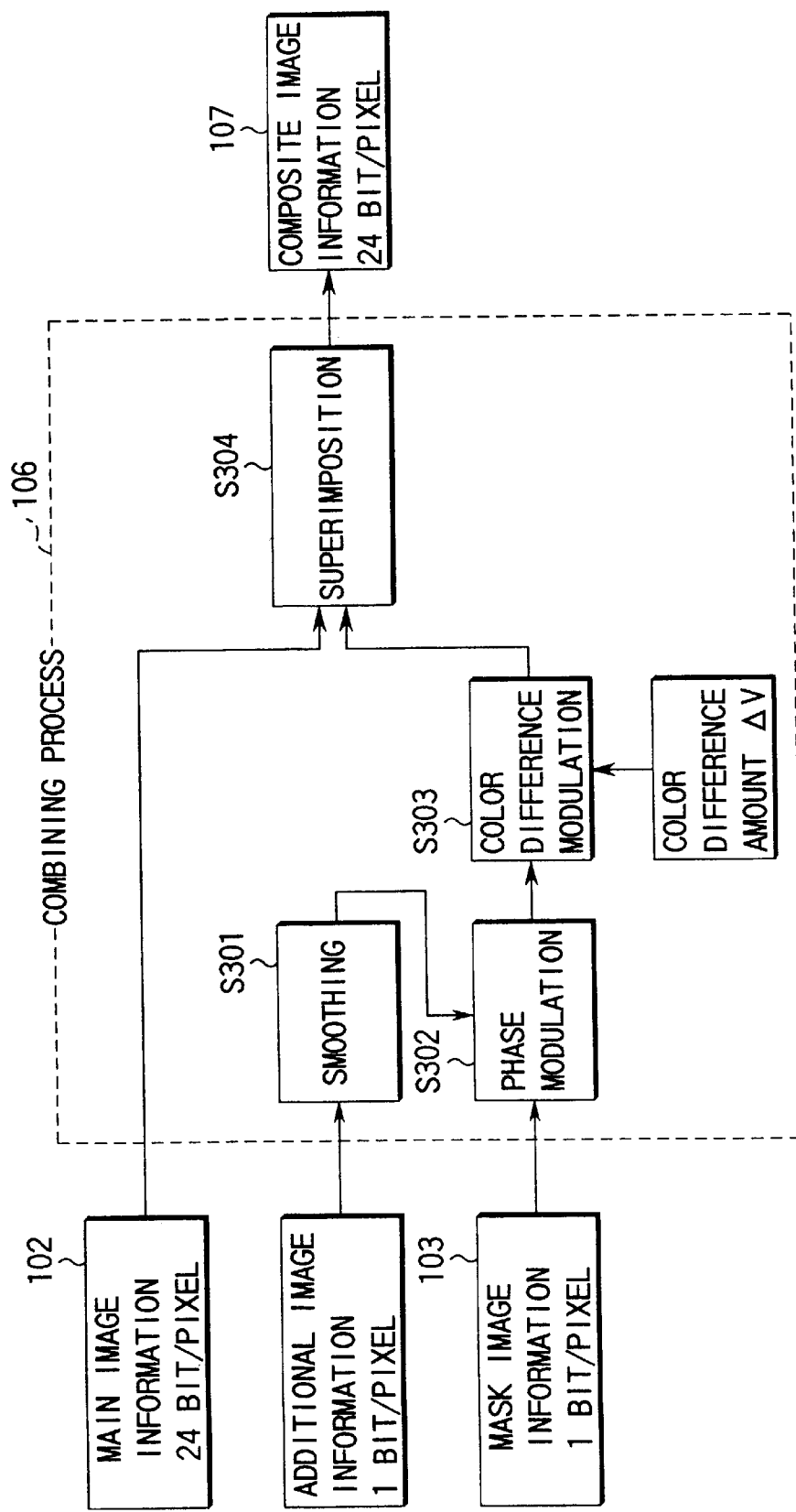
FIG. 6 illustrates the procedure for creating a composite image.

Next, the combining step S106 of FIG. 1 will be described in more detail with reference to FIG. 6.

The main image 102 is image information in which additional information is to be embedded and, in the case of an identity card, corresponds to an owner's face photograph. The image information has 24 bits of information per pixel (8 bits for each of R, G and B components). The to-be-embedded image 105 is a bilevel image obtained by converting additional information through the previously described technique and, in the case of an identity card, corresponds to an identification number by way of example. This information has one bit of information per pixel. The mask image 103 is image information used in the combining process and the embedded image recovery process and has one bit of information per pixel.

First, a smoothing process is performed in step S301 with black pixels in the to-be-embedded image 105 as 1s and white pixels as 0s. Here, a region of 3×1 pixels composed of a pixel of interest and two pixels on both sides of that pixel in the x direction is cut out, and the weighted mean is taken as follows:

$$W(i)=(STL(i-1)+2 \cdot STL(i)+STL(i+1))/4 \tag{1}$$

where $W(i)$=the weighted mean of the i-th pixel $STL(i)$=embedded image at the i-th pixel (1 or 0).

Attention must be given to the fact that, unless the to-be-embedded image is enlarged by a factor of n at the creation time as described in connection with FIG. 5, it is destroyed during the smoothing process. The larger the enlargement factor, the more the factor of safety of to-be-embedded image increases. However, as the enlargement factor increases, information that should be hidden becomes easier to be revealed.

For example, when a to-be-embedded additional image is as shown in FIG. 8, the results of the smoothing process will be as shown in FIG. 9. In these figures, the enlargement factor n is set to n=4, so that the image is enlarged by a factor of 4 in the vertical and horizontal dimensions. To leave a margin for embedding, each pair of two adjacent pixels on the periphery is set to 0s as shown in FIG. 8.

Next, in phase modulation step S302, on the basis of the results of the smoothing process in step S301, phase modulation is performed on the mask image 103 in accordance with the following rules:

If $W(i)=0$, then $DES(i)=MSK(i)$ (2-1)

If $W(i)=1$, then $DES(i)=MSK(i+2)$ (2-2)

Otherwise, $DES(i)=MSK(i+1)$ (2-3)

where

DES(i)=result of phase modulation of the i-th pixel (1 or 0)

MSK(i)=mask image of the i-th pixel (1 or 0).

Figure 10:
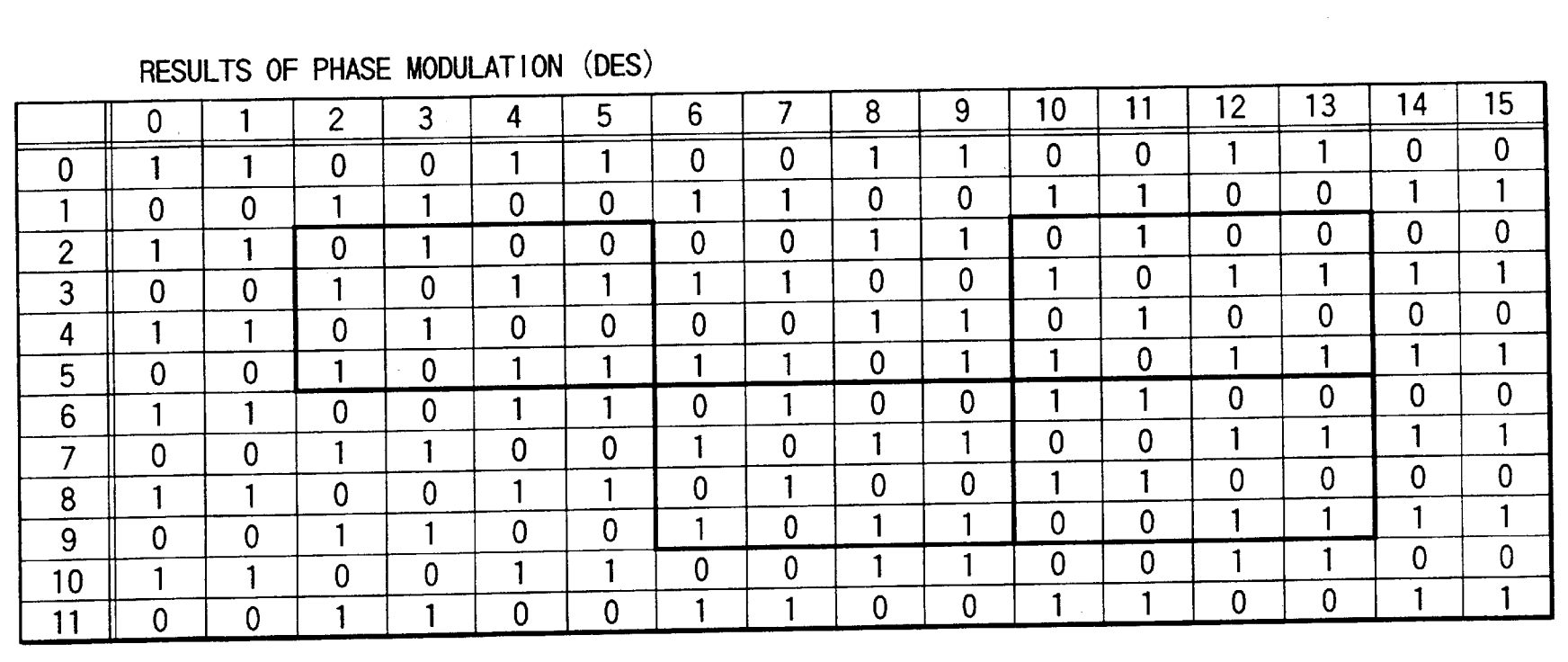

In this case, the smoothing process cannot be performed on the x=0 and x=15 columns of the image because they are located at the edges of the image; hence, phase modulation cannot also be performed on these columns. At the image edges, therefore, the mask image and the to-be-embedded additional image are EXCLUSIVELY-ORed. The results of the phase modulation are shown in FIG. 10.

Next, in color difference modulation step S303, on the basis of the results of the phase modulation in step S302, color difference modulation is performed in accordance with the following rules. In this case, the phase modulation is performed separately for each of three components R(red), G(green), and B(blue).

If $DES(i)=1$, then $VR(i)=-\Delta V$ (3-1)

$VG(i)=+\Delta V$ (3-2)

$VB(i)=+\Delta V$ (3-3)

If $DES(i)=0$, then $VR(i)=+\Delta V$ (3-4)

$VG(i)=-\Delta V$ (3-5)

$VB(i)=-\Delta V$ (3-6)

where

VR(i)=result of phase modulation of the i-th pixel for the red component (an integer in the range of −255 to +255)

VG(i)=result of phase modulation of the i-th pixel for the green component (an integer in the range of −255 to +255)

VB(i)=result of phase modulation of the i-th pixel for the blue component (an integer in the range of −255 to +255).

The results of color difference modulation for the red component are shown in FIG. 11.

Note here that the color difference amount $\Delta V$ is an integer in the range of 0 to 255. The larger the color difference amount, the higher the contrast of the embedded image at the time of recovery and the easier the reproduction. Increasing the color difference amount too much will make it easy for the embedded information to be revealed. It is therefore preferable that the color difference amount be in the range of 16 to 96. In this example, the color difference amount is set to 48.

Finally, in superimposing step S304, the composite image 107 is produced from the results of the color difference modulation in step S303 and the main image 102 by performing the following superimposing processes:

$DESR(i)=VR(i)+SRCR(i)$ (4-1)

$DESG(i)=VG(i)+SRCG(i)$ (4-2)

$DESB(i)=VB(i)+SRCB(i)$ (4-3)

where

DESR(i)=result of superimposition at the i-th pixel for the red component (an integer in the range of 0 to 255)

DESG(i)=result of superimposition at the i-th pixel for the green component (an integer in the range of 0 to 255)

DESB(i)=result of superimposition at the i-th pixel for the blue component (an integer in the range of 0 to 255)

SRCR(i)=main image at the i-th pixel for the red component (an integer in the range of 0 to 255)

SRCG(i)=main image at the i-th pixel for the green component (an integer in the range of 0 to 255)

SRCB(i)=main image at the i-th pixel for the blue component (an integer in the range of 0 to 255).

DESR(i), DESG(i) and DESB(i) are each an integer in the range of 0 to 255. Therefore, if they are calculated to be less than 0, they are set to 0, and if they are more than 255, they are set to 255.

The results for red component when all the pixel values of the main image 102 are 127, i.e., when (R, G, B)=(127, 127, 127), are shown in FIG. 12. Each pixel value takes an integer in the range of 0 to 255. The red component has the maximum value of 255. In this figure, the (0, 0) pixel and the (1, 0) pixel each have a value of 79, and the (2, 0) pixel and the (3, 0) pixel each have a value of 175. That is, in an area where no additional image is embedded, two successive pixels in which there is little red component and two successive pixels in which the red component is rich alternate.

As can be seen from equations (3-1) to (3-3) or (3-4) to (3-6), the color difference amount for red component is opposite in sign to those for green and blue components. Therefore, in a pixel in which the red component prevails, the green and blue components are reduced. In a pixel in which the red component is reduced, on the other hand, the other color components are increased. Green plus blue (i.e., cyan) is the complement of red. Thus, even if red and cyan are located adjacent to each other, they are difficult to recognize by human eyes and looks achromatic. Since red-rich pixels and cyan-rich pixels are alternated in units of two pixels, the human visual system cannot recognize the difference in color between pixels and hence will determine that the color difference amount is 0.

In terms of the human visual system, for example, equation (4-1) will be mistakenly taken to be $DESR(i)=SRCR(i)$ (5)

That is, humans cannot perceive the fact that additional image information has been embedded. It is on this principle that a composite image can be produced in which additional image information is embedded in a main image in a state of invisibility.

A composite image is usually recorded on an electronic medium in a general-purpose imaging format, such as JPEG, TIFF, or the like. However, in this embodiment, since to-be-embedded information does not depend on any imaging format, not only presently available imaging formats but also formats that will be developed in future can be employed.

A method of recovering embedded information from a composite image and reproducing it will be described hereinafter.

Figure 13:
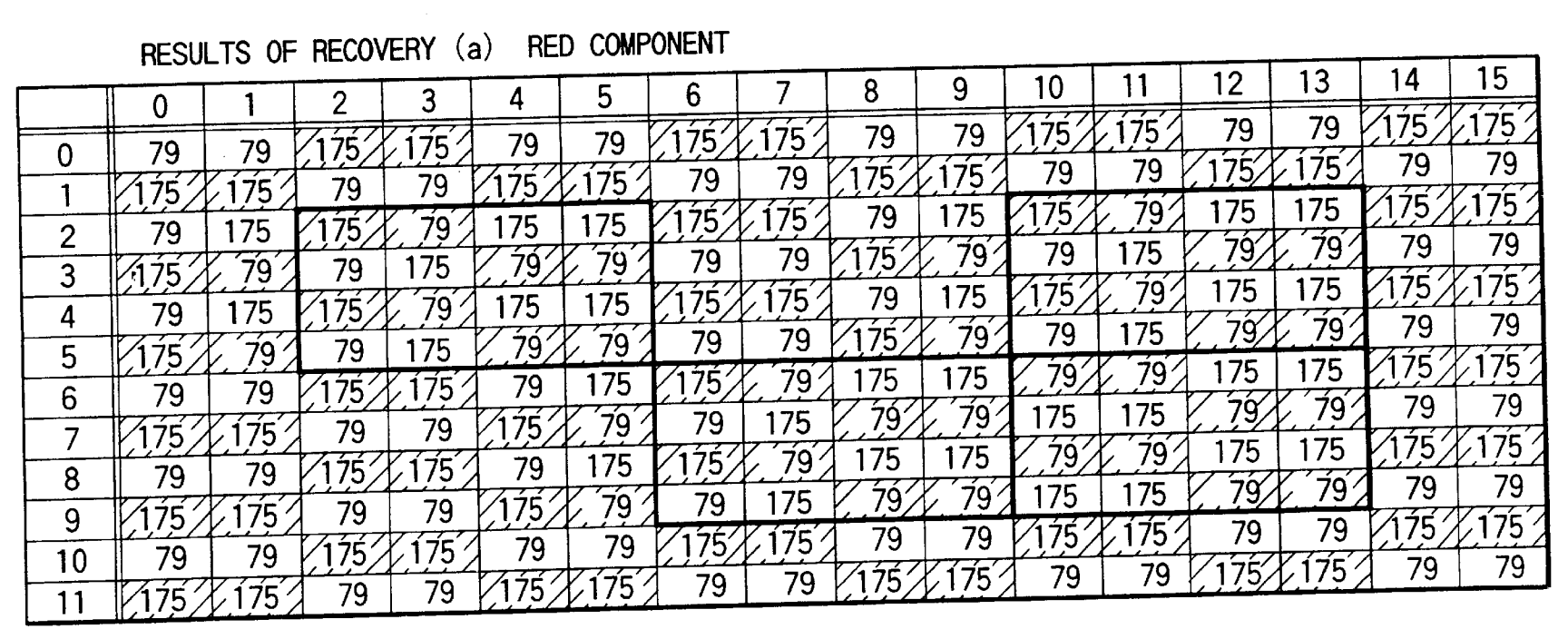

In the case of distribution via an electronic medium such as a home page on the Internet or electronic mail, the contents of a composite image are recorded on the electronic medium in such a form as shown in FIG. 12. To recover this image, the mask image 103 shown in FIG. 7 is used. The pixels of the mask image 103 are made to correspond one for one with the pixels of the composite image 107. The composite image is made effective in areas in which the mask image 103 takes a value of 1 or ineffective in areas in which the mask image pixels have a value of 0. The results are shown in FIG. 13. In this figure, shaded pixels are ineffective ones. The effective data pixels (shown unshaded) are cut out in a predetermined size.

In FIG. 8, the enlargement factor, n, is set such that n=4 and the embedded information is quadrupled. After the removal of pixels on the periphery provided for a margin for embedding, effective data is cut out in units of 4×4 pixels. If all the effective data pixels in a 4×4 pixel area take a red-rich value (175 in this example), then the embedded image in this area is made 1. If, on the other hand, they take a cyan-rich value (79 in this example), then the embedded image is made 0. When the effective data area contains both red-rich pixels and cyan-rich pixels, the embedded image depends on the pixels which are larger in number. For example, if the red-rich pixels are larger in number than the cyan-rich pixels, then the embedded image is made 1; otherwise, the embedded image is made 0. That both the red-rich pixels and the cyan-rich pixels are contained is attributed to the smoothing step in the combining process.

Figure 14:
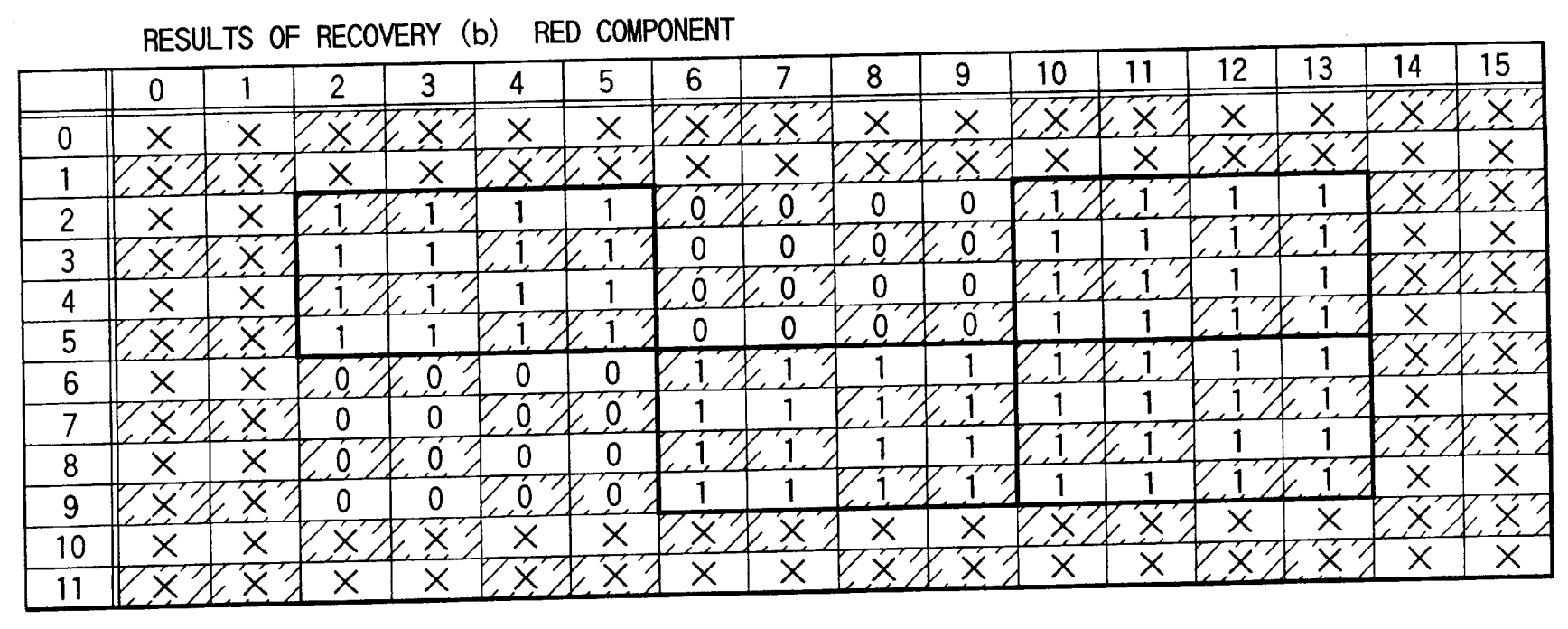

The results of recovery of the embedded image by this method are shown in FIG. 14. In this figure, portions enclosed by bold lines corresponds to the embedded image and matches with that of FIG. 8. It thus will be seen that the embedded information can be recovered completely. Furthermore, by reversing the procedure of creating the embedded image described in conjunction with FIG. 2, the embedded information can be reproduced.

When a composite image is printed on a non-electronic medium, such as paper, with a color printer, the same method can be used to recover an embedded image. In this case, the non-electronic medium printed with the composite image is read by an optical reader and digitization is then performed to obtain the state of FIG. 12. After that, the embedded information is simply recovered by the same method as described above.

After printing at a resolution of 400 dpi by means of a thermal printer in accordance with this embodiment and reading at a resolution of 1200 dpi by means of an optical scanner, recovery was made successfully.

In order to reproduce additional information from a non-electronic medium, another method of reproduction can be used by which a mask sheet is physically superimposed on the composite image, which has the transmission factor distribution of the same pattern as the mask image 103 and is produced at the same recording resolution as that at the time of recording a composite image. This method has an advantage of requiring no troublesome operations and complex equipment in recovering embedded information.

Figure 15:
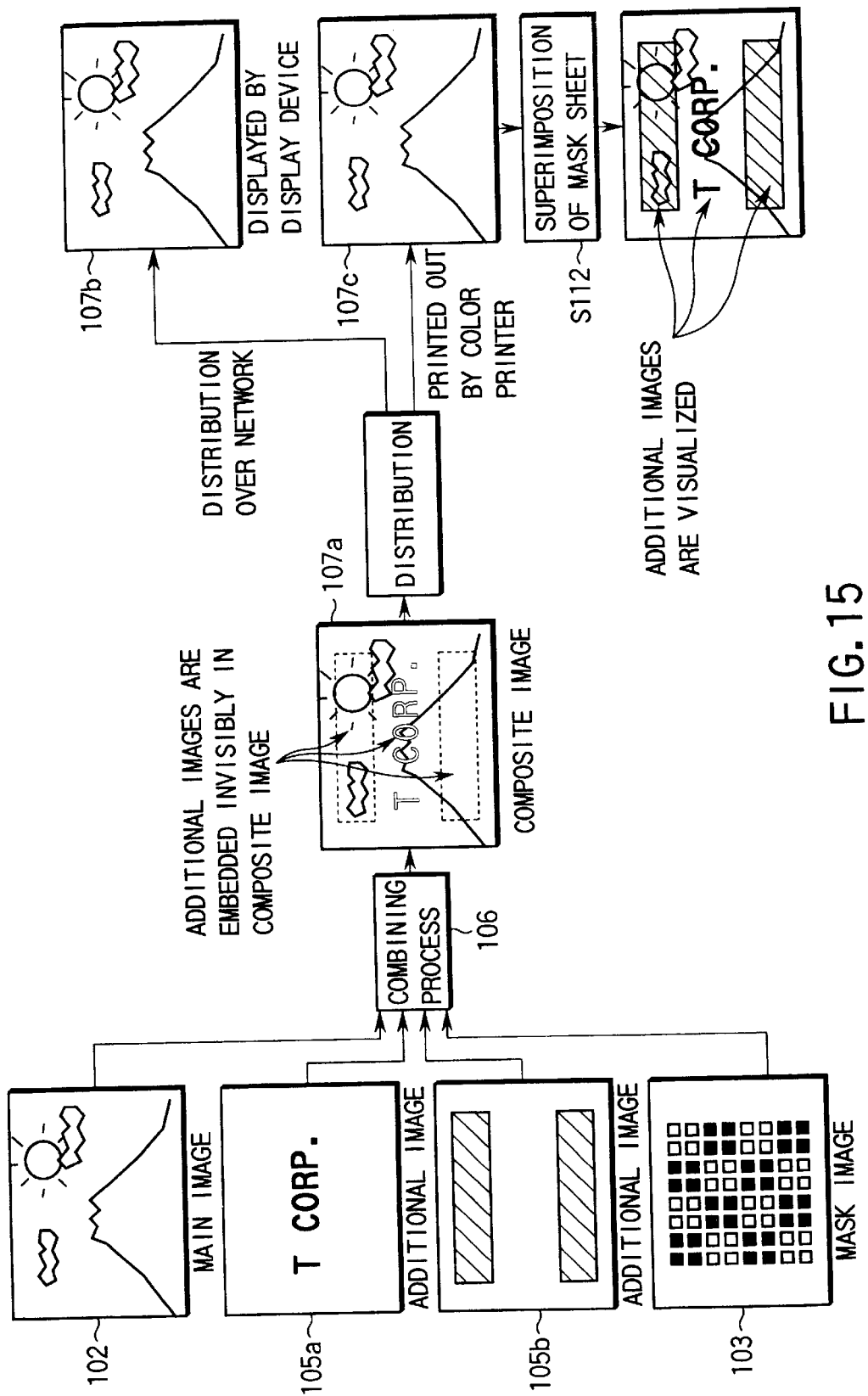
FIG. 15 illustrates an example of embedding information in a landscape photograph.

There is shown in FIG. 15 an embodiment in which copyright information and narration and associated background music (BGM) are embedded in, for example, a landscape photograph as the main image 102. A to-be-embedded additional image 105a uses the logotype, "T CORP.", as the copyright information. A to-be-embedded additional image 105b is one into which narration (voice) for explaining the landscape photograph and appropriate BGM have been converted in accordance with the procedure of the present invention. An element 103 is a mask image which serves as the key to the combining and recovery processes. Note that, though not shown, the to-be-embedded images 105a and 105b are combined in advance into a single to-be-embedded image.

Using the main image 102, the to-be-embedded images 105a and 105b and the mask image 103, the combining process according to the present invention is carried out to produce a composite image 107. This composite image appears simply as a landscape photograph to human eyes, but has the copyright information, narration, etc., embedded in a state of invisibility. The composite image is distributed over a network or through a paper medium in printed form. Depending on the contents of an image, a charge may be needed.

Upon receipt of the composite image over a network by a personal computer, the user is allowed to display the composite image 107b on the display unit and to recover and reproduce the invisibly embedded narration and so on in accordance with the technique of the present invention.

When receiving the composite image 107c printed in hard copy form, the user is allowed to read the composite image by means of an optical scanner and to recover and reproduce the embedded contents through the same processing as in the case of reception over a network.

Since the copyright information is embedded in the distributed composite image, it can be recovered and reproduced using the same procedure as in the case of the narration, which makes it possible to make clear who has the copyright of the composite image. Even if the composite image is copied by a color copying machine, the embedded image is protected from damage or destruction. Even if, therefore, there is no optical scanner, the embedded image can be reproduced by directly superimposing a mask sheet upon the composite image as in step S112 of FIG. 15. That is, the copyright information "T CORP." can be displayed visually. Thus, the copyright becomes obvious to everyone.

In reading the composite image 107 printed on a non-electronic medium, such as paper, through the use of an optical reader, the precision of the reading position is very important. For this reason, in order to record the composite image on a non-electronic medium, alignment marks M can be recorded on the composite image as shown in FIG. 16 to increase the precision of the reading position.

In this embodiment, the mask image 103 is made of checker-like patterns each of 4×2 pixels as shown in FIGS. 7 and 17. Of course, a pattern of 2×2 or 8×2 pixels can be used instead. It will be better to change the type of the mask image 103, depending on the time when the composite image is produced or its contents. By so doing, embedded information becomes prevented from being stolen by a third party.

By recording a portion of the mask image 103 on a corner of the composite image 107 as the alignment marks M of FIG. 16, an alignment function and a function of identifying the type of the mask image 103 can be provided at the same time, which provides a very excellent system.

To embed information, this embodiment utilizes the fact that equation (4-1) is taken as equation (5) because the sensitivity of human eyes is not enough. In order to prevent embedded information from becoming known, it is better to decrease the color difference amount $\Delta V$. The smaller the color difference amount $\Delta V$, the smaller the absolute value of $\Delta R(i)$ in equation (4-1) becomes and the more difficult it is to know the embedded information. When the composite image 107 is distributed via an electronic medium, it is relatively easy to identify the embedded information numerically even if the color difference amount $\Delta V$ is small. With non-electronic medium, however, optical reading is required to recover the embedded image as described before. In this case, taking into consideration the performance of the optical reading means, environmental conditions, printing variations in the embedded image, etc., unless the color difference amount $\Delta V$ is large to some degree there arises the possibility that the embedded image is buried in noise and cannot be identified.

If, when an output medium is known at the time of producing a composite image, the color difference amount ΔV is set such that ΔV=ΔV1 for electronic medium or ΔV=ΔV2 for non-electronic medium where ΔV1 ≦ΔV2, then an optimum composite image will be obtained. It is desirable that ΔV1 lie in the range of 16 to 64 and ΔV2 lie in the range of 48 to 96.

In recording a composite image on a non-electronic medium, as the color difference amount ΔV increases, embedded information becomes easier to identify; thus, the safety factor of reproduction increases. However, making the color difference amount large can make it easier for image information invisibly embedded in a composite image to be revealed to a third party. In outputting a composite image in printed form using a color printer, as image processing, error dispersion processing can be performed to prevent the embedded image from being revealed without being damaged. This is because, even if the density of each pixel in the composite image is compensated for by the error dispersion processing, the invisibly embedded image is preserved on a macroscopic basis. The error dispersion processing can be performed in addition to the previously described smoothing process.

The error dispersion processing decreases low-frequency components but increases high-frequency components. The embedded image in the composite image consists of high-frequency components. The error dispersion processing further increases the high-frequency components of the embedded image, which makes it more difficult for the embedded image to be identified visually.

Next, a description will be given of an image information processing device for implementing the image information processing method described so far. The processing device is constructed roughly from an image creating and recording device which creates and records a composite image on either an electronic medium or a non-electronic medium, and an image reproducing device which reproduces an embedded image from the composite image recorded on the electronic or non-electronic medium.

Figure 18:
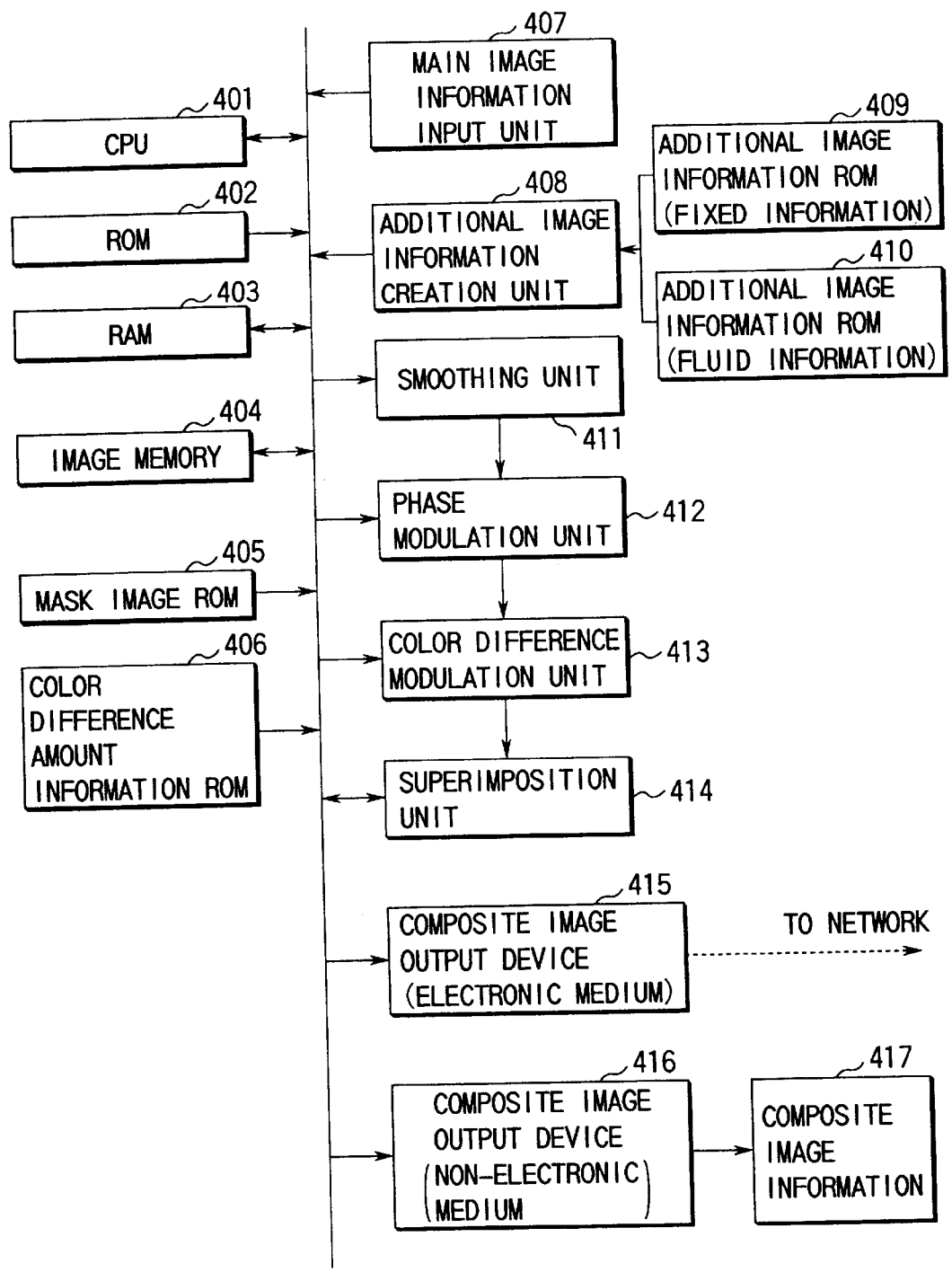
FIG. 18 is a block diagram of an image creating and recording system.

First, the image creating and recording device will be described with reference to FIG. 18. A CPU (central processing unit) 401 performs the overall control of the device. A ROM (read-only memory) 402 stores programs that the CPU 401 executes to control the operation of the entire device. A RAM (random access memory) 403 serves as a working memory of the CPU 401. An image memory 404 stores image information when images are combined and is used when processes are performed which will be described later.

A to-be-embedded image is divided into fixed information and fluid information. The fixed information includes serial numbers inherent in a system and so on, whereas the fluid information includes the date and time of processing, identification numbers, voice, etc. The fixed information and the fluid information are entered from a to-be-embedded image ROM 409 and a to-be-embedded image input unit 410, respectively, into a to-be-embedded image creation unit 408. A to-be-embedded image is created in accordance with the procedure shown in FIG. 2 and then stored in the image memory 404.

A main image 102, such as a photograph of the face of a person or a landscape photograph, is entered from a main image input unit 407 into a separate area of the image memory 404.

As instructed by an operator, the CPU 401 operates a smoothing unit 411 to perform a smoothing process on the to-be-embedded image stored in the image memory 404 and then sends the results to a phase modulation unit 412.

The phase modulation unit 412 performs a phase modulation process as shown in FIG. 11 on the basis of the results of the smoothing process and a mask image 103 from a mask image ROM 405 and then sends the results to a color difference modulation unit 413.

The color difference modulation unit 413 performs a color difference modulation process as shown in FIG. 11 on the basis of the results of the phase modulation process and color difference amount information from a color difference amount ROM 406 and then passes the results to a superimposition processing unit 414.

The superimposition processing unit 414 performs a superimposition process on the results of the color difference modulation and the main image 102 stored in the image memory 404 to produce a composite image 107 and stores it into the image memory 404.

When the composite image 107 is distributed via an electronic medium, it is distributed from a composite image output unit (electronic medium) 415 via a network by way of example. In the case of distribution via a non-electronic medium, the composite image is output from a composite image output unit (non-electronic medium) 416 composed of a printer driver and a color printer. That is, the composite image 417 (107) is output in printed form.

The image reproducing device will be described next with reference to FIG. 19. A CPU 501 performs the overall control of the device. A ROM 502 stores programs that the CPU 501 carries out to control of the operation of the entire device. A RAM 503 is used as a working memory of the CPU 501. An image memory 504 stores image information when embedded information is recovered and is used for processes which will be described later.

A composite image 507 (107) recorded on a non-electronic medium, such as paper, is read by a composite image reader 506 and then converted into digital data, which is in turn stored in an image memory 504. The composite image reader includes an optical scanner and its driver.

A composite image recorded on an electronic medium is directly stored into the image memory 504. The alignment marks M as shown in FIG. 16 are read out at the same time the composite image 507 is read and then stored in the RAM 503.

As instructed by the operator, the CPU 501 controls each unit to recover the embedded information.

The mask image creation unit 508 identifies the type of the mask image from the alignment mark information stored in the RAM 503, takes out of the mask image ROM 505 a mask information necessary for recovery and reproduction of the embedded image, creates mask image, and stores it into the image memory 504.

An embedded image visualization unit 509 for making visible the embedded image superimposes the mask image 103 and the composite image 507 (107) upon each other as illustrated in FIGS. 7 and 8 and extracts only the effective data of the embedded image, thereby visualizing the embedded image. After that, an embedded image reproduction unit 510 performs the procedure which is the reverse of that of FIG. 2, thereby reproducing the embedded information.

As described so far, according to this embodiment, a composite image in which additional information is superimposed on a main image can be created irrespective of which of electronic and non-electronic media it is to be recorded on. In addition, irrespective of the type of a recording medium used, the composite image can be recorded and added image information can be reproduced.

Therefore, multimedia contents, such as electronic picture books, picture mail, sounding pictures, and so on, can be produced very easily. In the case of an application to an identity card, the user can be identified as the owner very easily.

Figure 20:
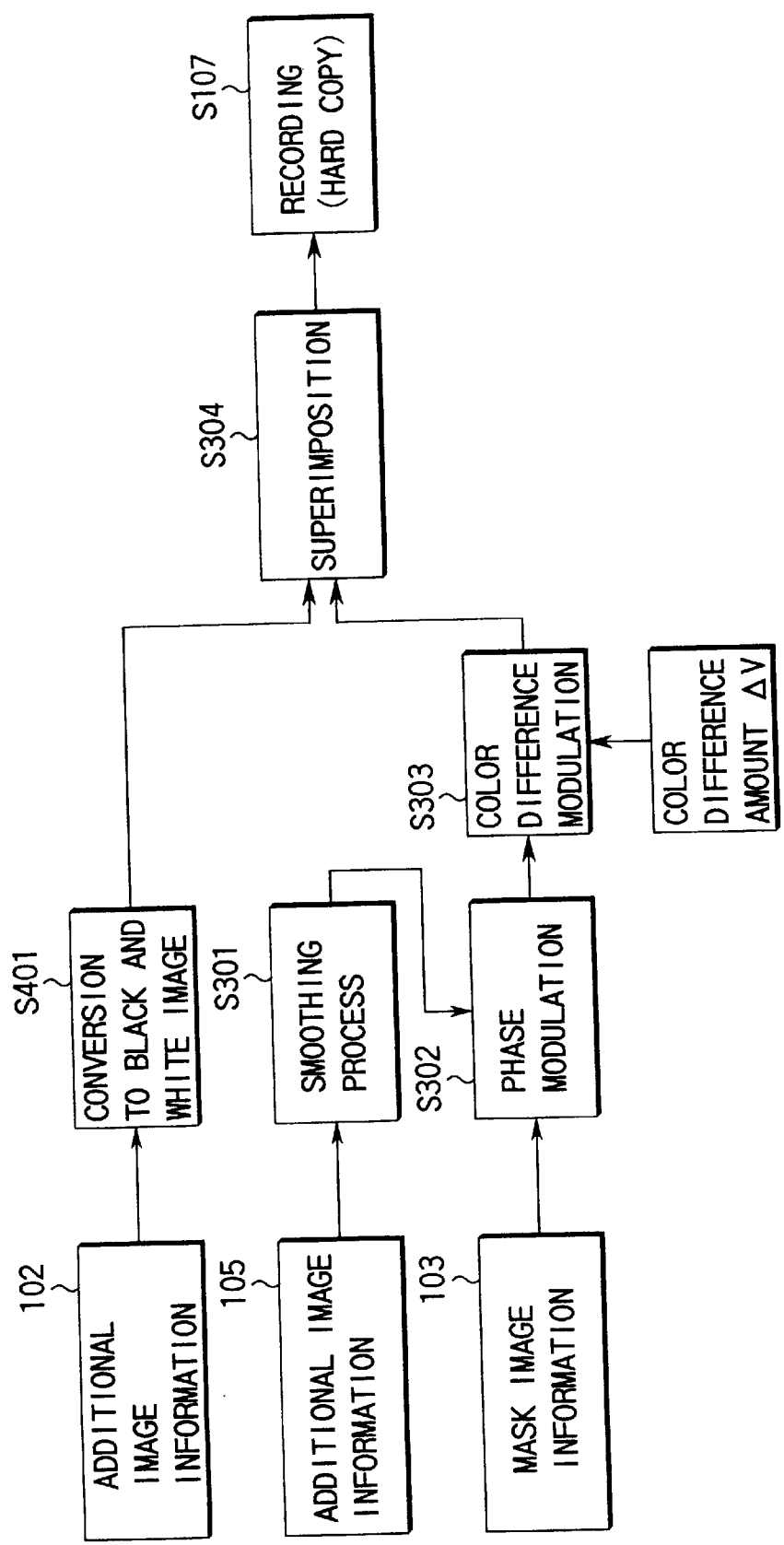
FIG. 20 is a flowchart illustrating an image information processing method according to a first embodiment of the present invention.

Next, a second embodiment of the present invention will be described. FIG. 20 illustrates a process flow of an image information processing method according to the second embodiment. This flowchart is the same as that of FIG. 6 except that an achromatic coloring (discoloration) process S401 is added.

In discoloration step S401, the main image 102 is subjected to discoloration. This is realized by averaging the R, G and B component values of each pixel. For example, when all the pixels of the main image have R, G and B component values of (R, G, B)=(180, 20, 181), they are discolored such that (R, G, B)=(127, 127, 127).

Next, in superimposition step S304, on the basis of the results of the color difference modulation in step S303 and the results of the discoloration in step S401, the superimposition processes indicated in equations (4-1) to (4-3) are carried out to produce a composite image. In this case, note that SRCR(i), SRCG(i) and SRGB(i) in equations (4-1), (4-2) and (4-3) have been converted to the same value by discoloration step S401.

As described previously, the main image subjected to discoloration and the additional image subjected to color difference modulation in step S303 are superimposed upon each other. The resulting composite image has its respective pixel composed of three color components of R, G, and B. However, since the main image 102 has been discolored (achromatic-colored), the resulting composite image also looks achromatic colors including black and white. For this reason, when the composite image is printed in auto mode by a color copying machine, the color difference information is not copied. That is, the composite image exhibits very high integrity of security.

Finally, in recording step S107, the composite image produced in step S304 is recorded (printed) on a recording medium such as an identity card.

Next, a description will be given of a method of, through the use of a mask sheet functioning as a key, reproducing the embedded information 105 from the composite image produced in the manner described above and recorded on the recording medium.

The recorded composite image has such data values as shown in FIG. 12. A mask sheet, which consists of a transparent sheet printed with the reverse image of the mask image 103 of FIG. 7, is prepared and then superimposed physically on the composite image. The result of this is shown in FIG. 13. Since the mask image 103 of FIG. 7 is reversed, the underlying composite image is blocked in portions of the reversed mask image in which data=0 (i.e., shaded portions in FIG. 13), but it is visible in portions of the reversed mask image in which data=1 (i.e., unshaded portions in FIG. 13).

Since the composite image is blocked with the mask sheet, it is visible only through the whitened portions of the mask sheet. Thus, focusing on the whitened portions only, data values on the periphery of the embedded image are 79, while data values within the embedded image are 175. The difference between these data values, i.e., the difference in image density, allows the shape of the embedded image to be recognized visually.

FIG. 13 shows the red component only. Likewise, the blue and green components have the differences in image density. However, since the embedded color difference amount for the red component is opposite in sign to those for the blue and green components as indicated in equations (3-1), (3-2) and (3-3), the image will appear to human eyes so that the red embedded image is embossed on the cyan background.

The composite image looks a black and white image. When the embedded image is recovered through a mask sheet, it looks colored red and embossed on the cyan background as described above, which will have great effect on inspectors and make it easy to inspect identity cards.

It is desirable to output the composite image and the mask sheet at the same resolution through the use of the same printer so that misalignment between pixels will not occur. In this embodiment, the operation at a resolution of 400 dpi using a sublimation type of thermal printer was performed successfully.

Next, a third embodiment will be described.

The third embodiment is intended to prevent the forgery of identity cards using the image information processing method of the second embodiment of the present invention.

Figure 21:
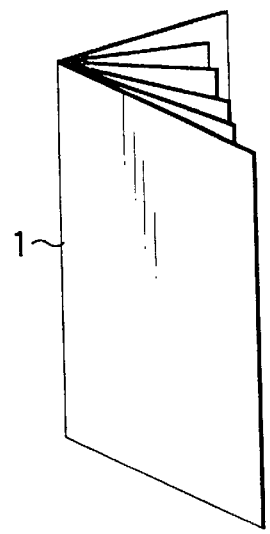
FIG. 21 shows an example of an identity card for explaining a second embodiment of the present invention.
Figure 22:
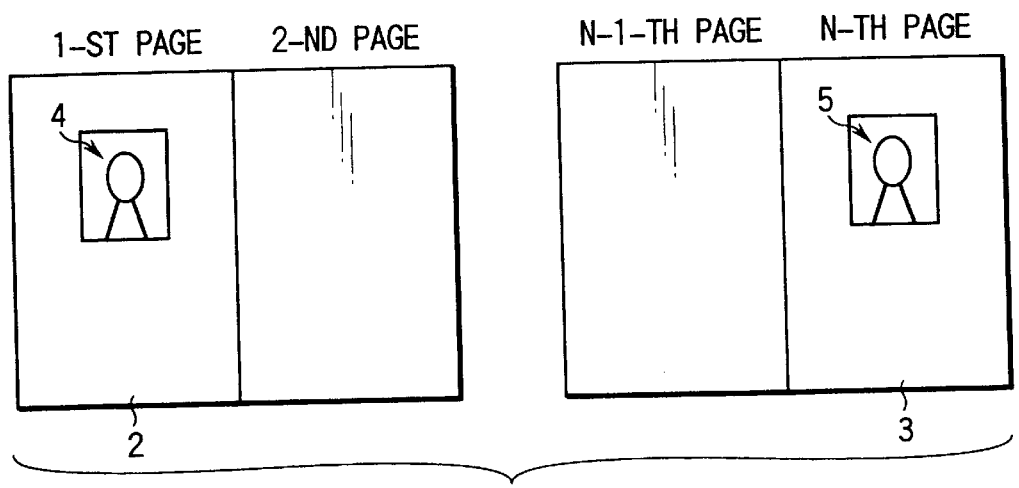
FIG. 22 is a diagram for use in explanation of printing (recording) a face photograph onto an identity card according to the second embodiment of the present invention.

FIG. 21 shows an example of a booklet-like identity card 1 with multiple pages. In this embodiment, as shown in FIG. 22, face photographs 4 and 5 of the owner are recorded (printed) on the first page 2 and the n-th (the last) page 3, respectively, of the identity card. The face photograph 4 on the first page is a common color photograph of the owner's face. On the other hand, the face photograph 5 on the last page is a variation of the face photograph 4, which is produced in such a way that the face photograph 4 is converted into a black and white image using the image information processing method of the second embodiment and then embedded with security information.

For increased security, the security information to be embedded preferably includes information associated with the owner himself or herself such as the name, the date of birth, the domicile of origin, and so on.

The face photograph 4 on the first page is used to identify the owner (user) of the identity card, while the face photograph 5 on the last page is used to assure the face photograph 4. In general, with the techniques of embedding security information in face photographs in a state of invisibility, the image quality of the composite image and the strength of the security information are incompatible with each other. That is, the image quality of the composite image degrades as the security strength increases.

In the third embodiment, by sharing a role between the face photograph image for identifying the person himself or herself and the face photograph image for security, the image quality and the security strength can be made compatible with each other.

The photograph image 5 on the last page 3 appears to human eyes as a black and white image; however, since it is composed of three primary colors of R, G, and B (or C, M, and Y), it, like the photographic image 4 on the first page, can be printed out by a usual color printer. That is, the apparatus can be used in common, which is very economical.

Although, in the third embodiment, two types of images, the identification image and the security image, are used, they do not necessarily need to be printed on the first page and the last page. If, in the identity card, there exists a page which is very secure, for example, a watermarked page, the security image can be printed on that page to further increase the security.

In the third embodiment, which uses the image information processing method of the second embodiment, the security strength and the image quality are not compatible with each other as described previously. Thus, the image quality degrades as the security strength increases. Hereinafter, causes of the degradation of image quality will be discussed.

As described previously, composite image data are expressed by $$DESR(i)=VR(i)+SRCR(i) \quad (4\text{-}1)$$

$$DESG(i)=VG(i)+SRCG(i) \quad (4\text{-}2)$$

$$DESB(i)=VB(i)+SRCB(i) \quad (4\text{-}3)$$

where

DESR(i)=result of superimposition at the i-th pixel for the red component (an integer in the range of 0 to 255)

DESG(i)=result of superimposition at the i-th pixel for the green component (an integer in the range of 0 to 255)

DESB(i)=result of superimposition at the i-th pixel for the blue component (an integer in the range of 0 to 255)

SRCR(i)=main image at the i-th pixel for the red component (an integer in the range of 0 to 255)

SRCG(i)=main image at the i-th pixel for the green component (an integer in the range of 0 to 255)

SRCB(i)=main image at the i-th pixel for the blue component (an integer in the range of 0 to 255).

Note that DESR(i), DESG(i) and DESB(i) each take an integer in the range of 0 to 255. For example, when VR(i)=48 and SRCR(i)=240, DESR(i)=48+240 =288, exceeding 255. In practice, when 255 is exceeded, an overflow results, so that 38 by which the result exceeds 255 is thrown away. Properly speaking, with DESR(i)=288, the embedded image should have well balanced with the composite image, so that it is placed in a state of invisibility. However, since DESR(i) is limited to 255 as a result of overflow, the embedded image (security information) becomes visible.

This is the cause of the degradation of quality of the composite image. In order to minimize the degradation, it is required to decrease the color difference amount ΔV so that the overflow is minimized. However, the security strength lowers as ΔV decreases. Although the case of overflow has been described so far, the same phenomenon also occurs with underflow in which DESR(i) is less than 0.

Figure 23A:
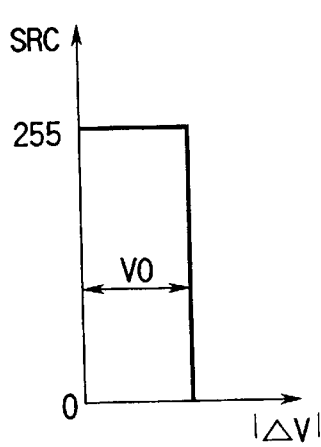
FIGS. 23A, 23B and 23C each show a relationship between the amount of color difference and data values of a main image in which additional information is to be embedded.

In the previously-described image information processing method of the second embodiment, the color difference amount ΔV is fixed at Vo regardless of SRC (indicating data values of the embedded image) shown on the vertical axis as shown in FIG. 23A.

Figure 23B:
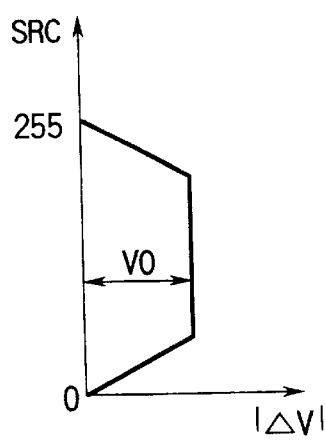

By establishing a trapezoid relationship between ΔV and SRC as shown in FIG. 23B, that is, by making ΔV vary with the embedded image data value in a region close to 0 where underflow is likely to occur and in a region close to 255 where overflow is likely to occur, underflow or overflow is made difficult to occur. This improves balance between the composite image and the embedded image, allowing the image quality of the composite image to be improved with the security strength maintained.

In this case as well, however, there arises the problem that, when the main image data value is just 0 or 255, no embedding is performed.

Figure 23C:
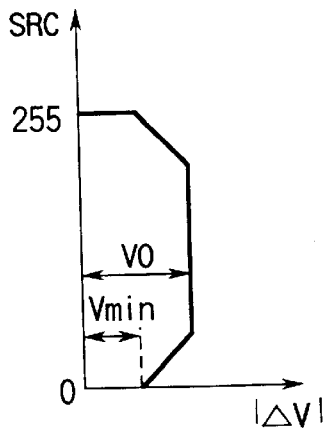

These problems can be circumvented by setting a minimum color difference amount Vmin as shown in FIG. 23C. Strictly speaking, overflow or underflow will occur when the color difference amount is at Vmin. Thus, the image quality degrades in comparison with the case of FIG. 23A; however, this level of degradation is out of the question as compared with the case of FIG. 23A. By setting Vmin to Vo/2 on an experience basis, the image quality of the composite image and the strength of security can be made compatible with each other.

As described so far, according to the second and third embodiments of the present invention, an image information processing method and a method of preventing the forgery of identity cards and so on can be provided which provide great security against forgery without making any distinction between color image information and black and white image information.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of preventing the forgery of identity cards comprising:

preparing an image of the face of a person for identification and a composite image in which security information for assuring the image of the face of the person is embedded in a state of invisibility; and recording the image of the face of the person and the composite image in different positions on an identity card, wherein the composite image is produced by converting a main image comprising an image of the person's face into achromatic image information, modulating an additional image comprising characters or images using predetermined pattern image information to produce a pattern-modulated image information, adding predetermined color difference amounts to the resulting pattern-modulated image information, and superimposing the pattern-modulated image information having the color difference amounts added on the main image converted into the achromatic image information.

* * * * *